A. R. THOMPSON.
HEATING APPARATUS.
APPLICATION FILED FEB. 11, 1918.
1,357,598.
Patented Nov. 2, 1920.
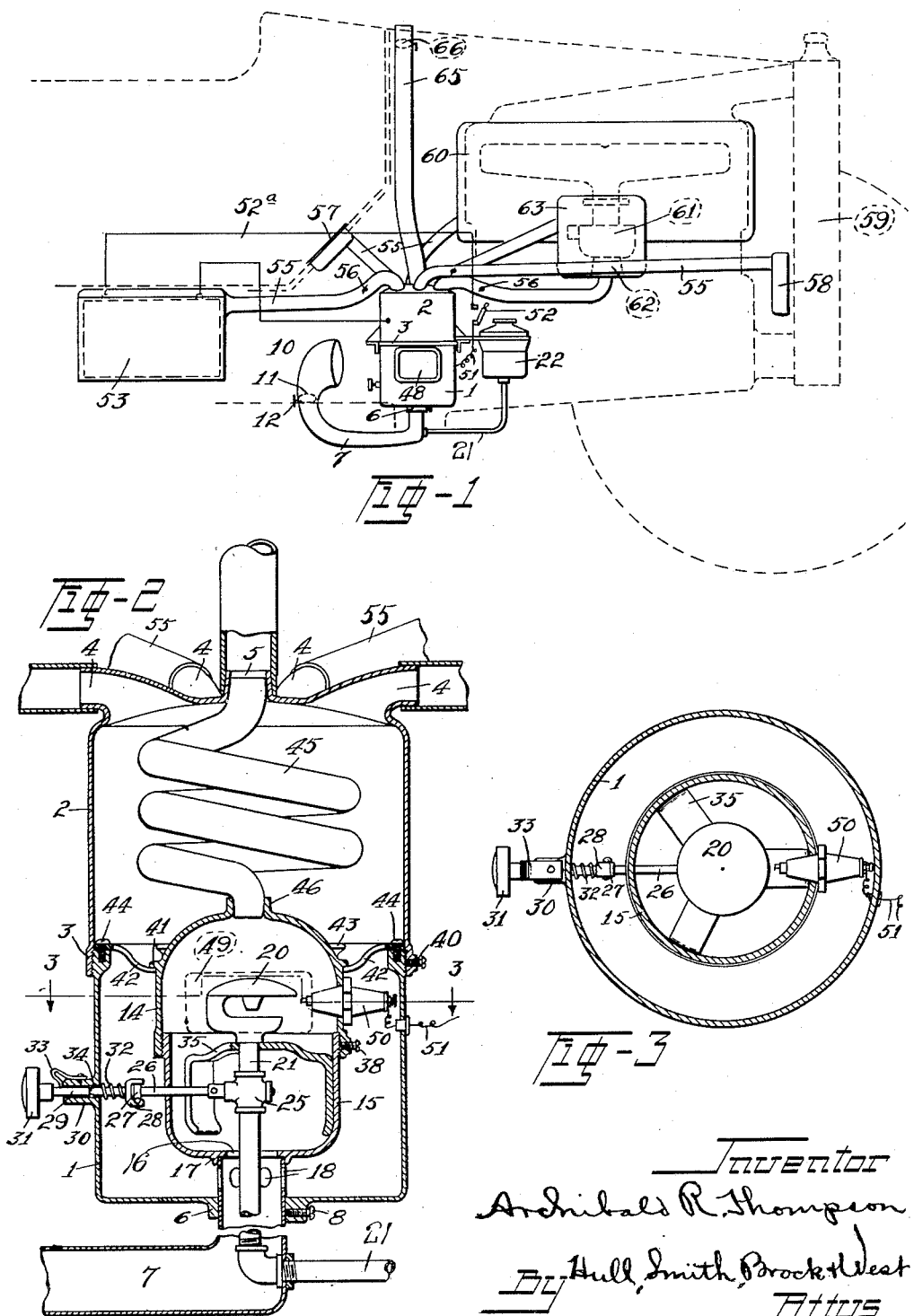

UNITED STATES PATENT OFFICE.

ARCHIBALD R. THOMPSON, OF CLEVELAND, OHIO.

HEATING APPARATUS.

1,357,598. Specification of Letters Patent. Patented Nov. 2, 1920.

Application filed February 11, 1918. Serial No. 216,553.

*To all whom it may concern:*

Be it known that I, ARCHIBALD R. THOMPSON, a citizen of the United States, residing at Cleveland, in the county of Cuyahoga and State of Ohio, have invented a certain new and useful Improvement in Heating Apparatus, of which the following is a full, clear, and exact description, reference being had to the accompanying drawings.

This invention relates to a heating apparatus devised especially for use with automobiles.

It has for its general object to provide a comparatively simple and efficient heating system which may be conveniently and economically operated, and from which heat may be supplied to either the carbureter; air intake of the carbureter; the engine generally; the radiator; the battery; and the interior of the car; or to all of these elements.

Further and more specific objects are to provide a construction for a heating device which affords ease of accessibility of parts; ease of assembling and disassembling; nicety of draft adjustment; wherein the combustible heating agency may be electrically ignited; wherein a proper draft prevails when the vehicle is in motion; and which is compact, and is adapted for installation in automobiles of standard design.

The foregoing objects and others which will become apparent as this description proceeds are attained in the exemplification of my invention illustrated in the accompanying drawing, wherein Figure 1 is a diagrammatic representation of an automobile having my heating system installed therein, the usual automobile parts being indicated in dotted lines, while the elements of my heating system are distinguished therefrom by full lines; Fig. 2 is a central vertical section through the heating device; and Fig. 3 a horizontal section on the line 3—3 of Fig. 2.

The heating device shown in detail in Figs. 2 and 3 comprises an outer casing that is made up of a lower cup shaped member 1 and a heat accumulating dome 2, that are screw threaded together at 3. A series of outlet connections 4 extend from the upper end of the dome 2 and a flanged opening 5 is shown as occupying the center of the top wall of the dome. The bottom wall of the casing member 1 is also provided with a central aperture that is surrounded by a depending flange 6 within which the upper end of an air admitting tube 7 is adapted to be clamped by a set screw 8 that is threaded through an enlargement of the flange. The end of the tube 7 remote from the heating device is turned upward and flared to constitute a cowl 10, that is directed toward the front of the automobile, and the draft created within the tube, when the automobile is in motion, may be controlled by a damper 11 that is located within the throat of the tube, the same having a handle 12 through which it may be turned. The inner end of the tube 7 projects a suitable distance above the bottom wall of the casing member 1 and supports an inner casing that is composed of upper and lower members 14 and 15, respectively, the latter having an opening 16, surrounded by a flange 17 that receives the end of the tube 7. Between the inner casing and the bottom wall of the outer casing, the tube 7 is provided with openings 18.

A heating element 20 of any approved sort is located within the inner casing, and in the present instance is shown as a hydrocarbon burner, attached to the upper end of a fuel supply pipe 21 that rises through the vertical end of the tube 7 and, at the elbow of the tube, is turned laterally through the side thereof and carried upward for connection with a reservoir 22 that may be supported in any convenient location. A valve 25 is included in the fuel supply pipe, and is preferably situated in the inner casing, the stem 26 of the valve extending out through the wall of the casing beyond which wall it is provided with a T-head 27. This head is adapted to be embraced by a yoke 28 that is carried by the inner end of a spindle 29, journaled within the boss 30 of the casing member 1, the outer end of the spindle being equipped with a suitable turning knob 31. The spindle is slidable within the boss 30, and a spring 32, interposed between the yoke 28 and the adjacent wall of the outer casing, tends to retain the spindle inward with its yoke in operative relation to the T-head of the valve stem. When it is desired to remove the inner casing from the outer casing, the spindle 29 may be retracted against the tension of the spring 32 to disengage its yoke from the head of the valve stem far enough to permit a spring 33, carried by the boss 30, to engage a groove 34 in the spindle and hold the spindle retracted. A spider 35 may be employed to maintain the upper end of the fuel supply pipe central within the inner casing. The casing members 14 and 15 are shown as screwed together, and a set screw 38 may be employed to hold them locked against unscrewing, in like manner that a set screw 40 serves the same purpose in connection with the members of the outer casing.

The casing member 14 is shown as having an annular flange 41 that bears upon the inwardly extending fingers 42 of a ring 43, that is attached to the upper end of the casing member 1, as by screws 44. A radiator 45, consisting of a coil of suitable tubing, occupies the dome 2 and has one of its ends inserted within the aperture 5 thereof, while its opposite end occupies a flange 46 that surrounds a central opening within the top of the casing member 14. The radiator or coil 45 is preferably formed of resilient tubing so that force is exerted between the upper ends of the inner and outer casings to hold the inner casing firmly down against the supporting fingers 42 of ring 43 (which may also be made of resilient material) and against the tube 7 which, it will be remembered, may be adjusted within the flange 6 to adapt itself to the exact location of the inner casing.

The inner and outer casings are preferably provided with alining sight openings that may be covered with mica or other suitable transparent material, the opening of the outer casing being indicated at 48, and that of the inner casing at 49.

An electrical igniter 50 is shown as supported by the member 14 of the inner casing in operative relation to the burner, and a wire 51 may be led therefrom to one side of a conveniently located switch 52. The opposite side of the switch has connection, through the wire 52ª to the battery 53, and the other side of the battery is shown as grounded to the heater casing.

Heat distributing tubes 55, which may be equipped with dampers 56, are shown as leading from the outlet connections 4 of the dome 2 to various parts of the machine, one being connected to a register 57 in the floor of the automobile; another to a register 58 that is located in proximity to the radiator 59; a third to the box inclosing the battery 53; a fourth to a hood 60 that incloses the engine cylinders; while two others lead to the carbureter 61, one communicating with the air inlet 62 thereof, and the other opening into a jacket 63 that incloses the carbureter.

A flue 65 is applied to the flanged outlet 5 of the dome 2 and in communicative connection with the outlet end of the radiator 45. The flue is equipped with a damper 66 through which its draft may be regulated.

While I have shown casings inclosing the engine cylinders and carbureter, it will be understood that this is only a conventional representation of means for confining the heat, to a certain extent, to the parts to be heated; and I regard it as clearly within the spirit of my invention to modify the herein disclosed details to any extent desired so long as I restrict myself to the scope of the appended claims.

Having thus described my invention, what I claim is:—

1. A heater for use with conveyances comprising a combustion device, a casing inclosing the same and having an air inlet and an outlet for the products of combustion, means for controlling the combustion device extending exteriorly of the inner casing, an outer casing having an air inlet and an air outlet, and operating means carried by the outer casing and having separable connection with the control means of the combustion device.

2. A heater for use with conveyances comprising a combustion device, a casing inclosing the same, control means for the combustion device extending exteriorly of the casing, an outer casing inclosing the former casing, a spindle rotatably and reciprocably supported through the wall of the outer casing, the same having means at its outer end for operating it and means at its inner end for coupling it to the control means of the combustion device, a spring tending to move the spindle inward for coöperation with the control means, and further means for retaining the spindle temporarily outward.

3. A heater for use with conveyances comprising an inner casing made up of upper and lower sections, an outer casing inclosing the former casing and made up of upper and lower sections, means for holding the upper and lower sections of the respective casings together, an air inlet conduit leading through the bottom of the outer casing and whereon the inner casing reposes, said conduit having vents opening into the outer casing, a combustion device within the inner casing, a fuel supply pipe therefor leading in through the inlet conduit, a supporting annulus carried by the lower section of the outer casing, the upper section of the inner casing having a ledge supported thereby, the casings having openings in their top walls, and a resilient radiator coil confined between the tops of the inner and outer casings and communicating with said openings thereof.

4. A heater for use with conveyances comprising inner and outer casings, means supporting the inner casing within the lower portion of the outer casing, the inner and outer casings having outlet openings in their top walls, a resilient radiator coil confined between the top walls of the casings and communicating with the respective outlet openings thereof, and a combustion device within the inner casing, the casings having air inlets, and the outer casing a heat distributing outlet.

5. A heater for use with conveyances comprising a combustion device, a casing inclosing the same, control means for the combustion device extending exteriorly of the casing, an outer casing inclosing the former casing, and a spindle supported through the wall of the outer casing, the same having means at its outer end for operating it and means at its inner end for coupling it to the control means of the combustion device.

In testimony whereof, I hereunto affix my signature.

ARCHIBALD R. THOMPSON.